United States Patent [19]

Michel et al.

[11] 4,141,492
[45] Feb. 27, 1979

[54] SIGNATURE VERIFIER WITH INDICIA SENSOR

[75] Inventors: Walter A. Michel, Highland Park; Donald E. Hagenbart, Oak Forest, both of Ill.

[73] Assignee: R. R. Donnelley & Sons, Inc., Chicago, Ill.

[21] Appl. No.: 838,651

[22] Filed: Oct. 3, 1977

[51] Int. Cl.² .................. G06K 7/14; G06K 13/08; B65H 5/22
[52] U.S. Cl. .................................. 235/437; 235/476; 271/3.1
[58] Field of Search ............... 235/445, 454, 462, 459, 235/375, 380; 250/555, 566, 568, 569; 271/3, 3.1

[56] References Cited

U.S. PATENT DOCUMENTS

| | | | |
|---|---|---|---|
| 3,061,188 | 10/1962 | Mason | 235/476 |
| 3,322,935 | 5/1967 | Wyke et al. | 235/462 |
| 3,529,133 | 9/1970 | Kent et al. | 235/462 |
| 3,731,060 | 5/1975 | Weinstein | 365/120 |
| 3,777,165 | 12/1973 | Bryant et al. | 235/462 |

*Primary Examiner*—Daryl W. Cook
*Attorney, Agent, or Firm*—Wegner, Stellman, McCord, Wiles & Wood

[57] ABSTRACT

Signatures of a book are identified with a binary coded indicia on the backbone. A signature verifier having a row of indicia sensors associated with the stack of signatures in the stream feeder of a gathering machine senses the coded indicia. In the event of an error, the verifier gives an alarm or stops the stream feeder. A book of plural signatures has a plurality of indicia on the backbone. A verifier has corresponding plural rows of sensors which detect the indicia and are sampled sequentially.

19 Claims, 7 Drawing Figures

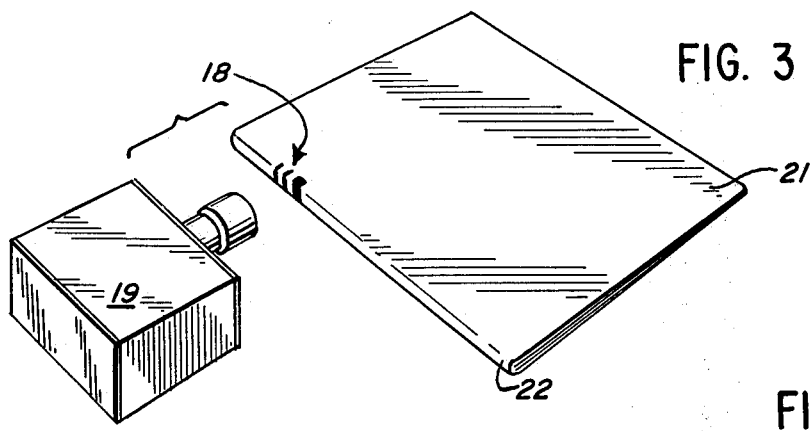
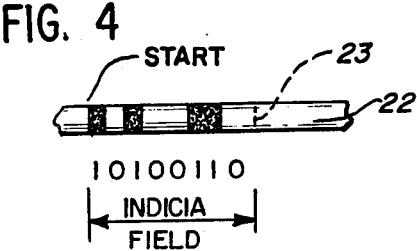
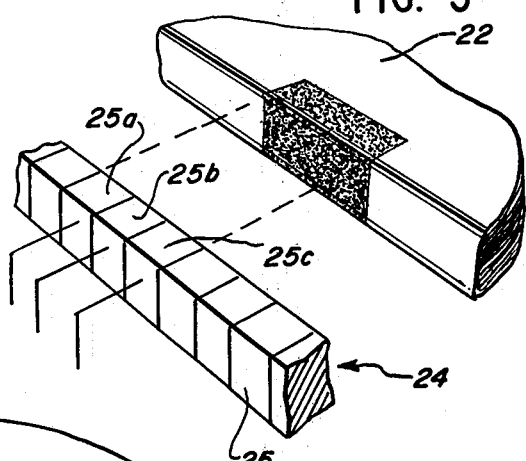
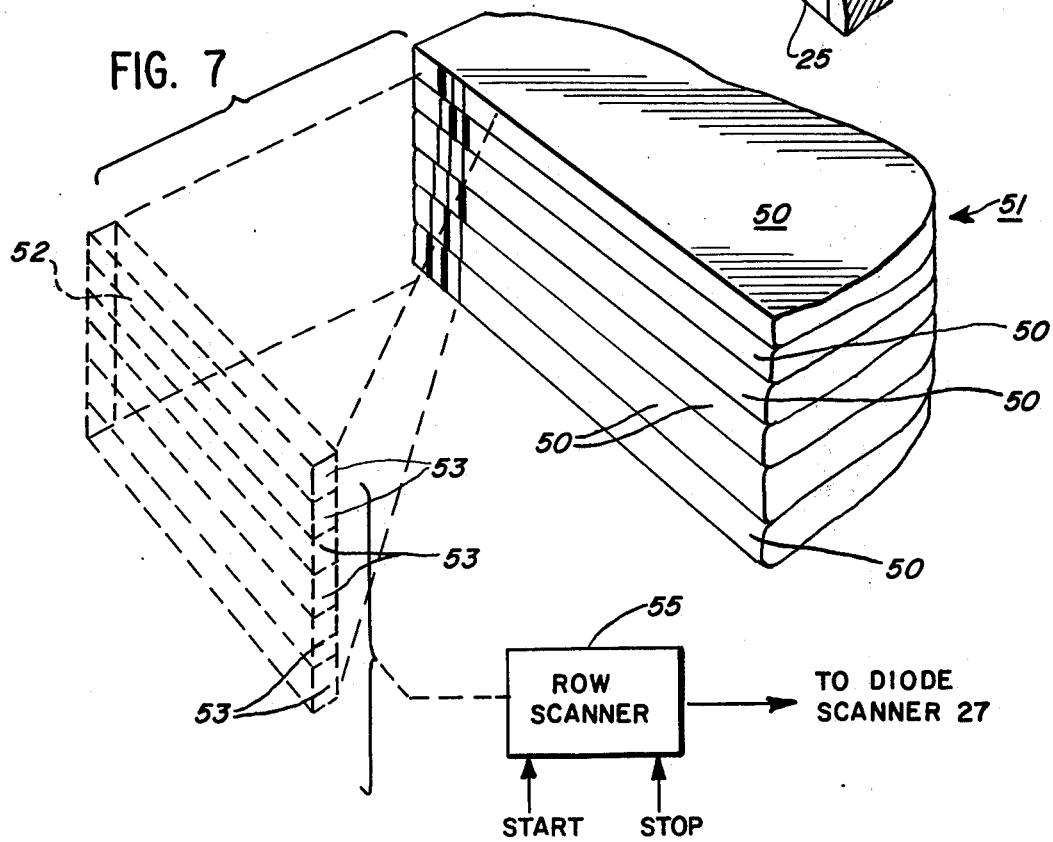

SIGNATURE VERIFIER WITH INDICIA SENSOR

This invention is concerned with an indicia sensor and a verifier particularly suited for verifying the signatures of a book or magazine.

BACKGROUND OF THE INVENTION

In the binding operation during manufacture of a book or magazine, signatures are collated in a predetermined order to make up the volume. Swanson U.S. Pat. Nos. 3,522,943 and 3,880,419 are typical of gathering apparatus in which signatures are successively assembled on a conveyor. Each of several signatures is delivered in a continuous, shingled stream from a signature stack to a signature feed assembly. Single signatures are successively placed on a conveyor by the feed assemblies. It is necessary that care be exercised to insure that the correct signatures are assembled in the desired order and with proper orientation. This has been done by observation of the assembly operation.

SUMMARY OF THE INVENTION

In accordance with the invention, each signature is identified by binary coded indicia with a different code sequence representing different signatures. The signature codes are sensed at an inspection point, preferably in the signature stack from which the signatures are delivered in a shingled stream to the feed assembly of the gathering machine. If an error is noted, an alarm is given or the stream feeder is stopped.

More particularly, the binary coded indicia is preferably a series of areas of contrasting color, as black and white, located on the backbone of the signature. The indicia of each signature is detected by photosensors as the signatures in a stack move downwardly for delivery to the stream feeder.

One feature of the invention is a verifier for signatures including means for sensing indicia on a signature, means for comparing the sensed indicia with the indicia of a desired signature and means responsive to an error to generate a warning signal.

Another feature is that the verifier is associated with apparatus in which signatures successively pass an inspection point, with means for sensing the indicia as each signature passes the inspection point.

A further feature is that the verifier includes an indicia translator for binary coded indicia elements with a code START element which contrasts with its background, and including a plurality of sensors to sense the coded indicia elements simultaneously, there being at least one sensor for each element of the indicia. Signals representing the sensor outputs are connected sequentially with a shift register. Means responsive to receipt of the signal representing the indicia START element at the last stage of the shirt register indicates that the sensors responding to the indicia have all been scanned.

Yet another feature is the provision of an error counter responsive to the indicia comparing means to generate a warning signal after a set number of errors have occurred.

And a further feature is a verifier for a plurality of assembled signatures each having an indicia, including means for sensing an indicia simultaneously and for sequentially scanning the indicia of each signature.

Further features and advantages of the invention will readily be apparent from the following specification and from the drawings, in which:

FIG. 3 is a diagrammatic perspective view of a signature with coded indicia on the backbone thereof and an optical indicia sensor;

FIG. 4 is an enlarged illustration of a typical binary coded indicia;

FIG. 5 is an enlarged diagram of a code element and the optical sensors associated therewith;

FIG. 7 is a fragmentary diagrammatic perspective illustrating a modification of the signature verifier system used with signatures assembled in a volume.

Figure 1:
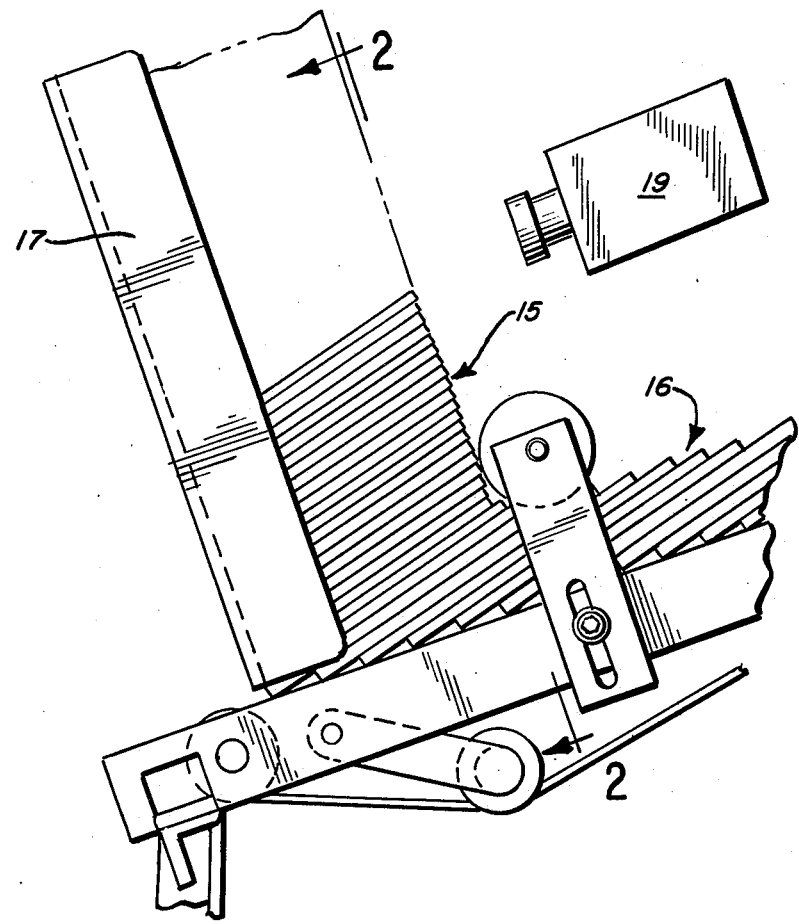
FIG. 1 is a fragmentary side elevation of a portion of a stream feeder incorporating the invention.
Figure 2:
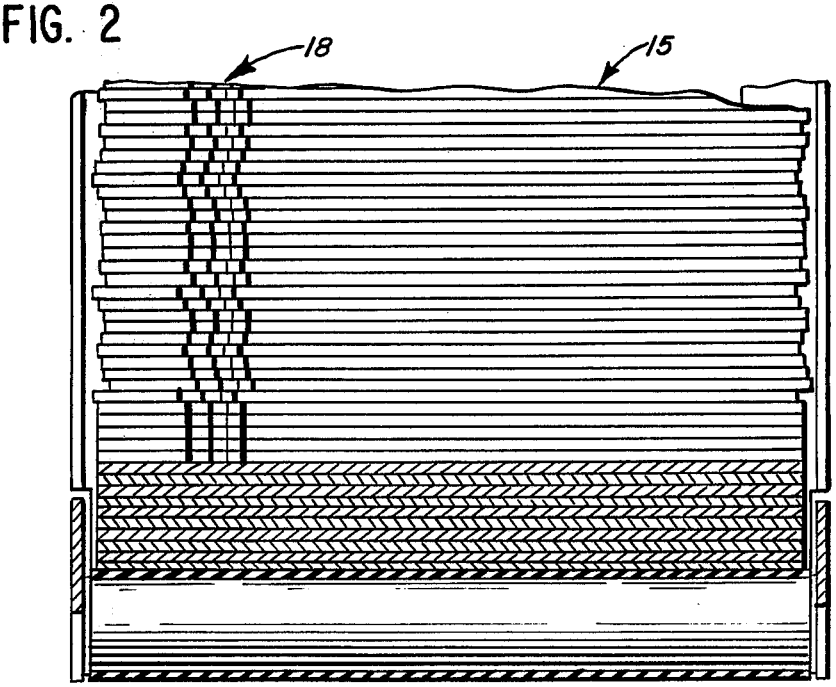
FIG. 2 is an elevation view of the stack of signatures in a stream feeder taken generally along line 2—2 of FIG. 1.

Referring first to FIGS. 1 and 2, a stack 15 of signatures is shown in a stream feeder. Single signatures withdrawn from the bottom of stack 15 are transferred in a shingled stream 16 to further handling apparatus, not shown. Details of the handling apparatus may be found in Swanson U.S. Pat. Nos. 3,522,943 and 3,880,419. Signature stack 15 is supported in a slightly inclined attitude by channel members 17. Each of the signatures has an identifying marking or indicia 18 on the backbone thereof, at a location exposed between channel members 17. An indicia sensor 19 is located at an inspection point adjacent the stack. The indicia 18 on each signature 21 is sensed as the signatures move downwardly in the stack past the inspection point. If an incorrect indicia is detected, an alarm is given or the stream feeder is stopped or both. The indicia on the signatures need not be vertically aligned, as will appear.

The indicia 18 is preferably a series of markings extending along the signature backbone 22 and which may be sensed optically. Typically, the indicia may be printed at the same time the text of the signatures is printed. The sensor 19 has a sensing field with a dimension along the signature backbone which is greater than the maximum indicia dimension, and a dimension at right angles to the signature backbone which is less than the indicia dimension.

The nature of a preferred form of two color indicia is illustrated in FIGS. 3 and 4. For example, the indicia may be black marks printed on a white background, suitable for optical sensing. The indicia field shown is divided into eight elements or bits. Binary coding may be used with black representing 1 and white representing 0. The system requires a code in which the first element is distinguishable from the background. Accordingly, the first element is black or 1 and is indicated as START. The coded identification illustrated in FIG. 4 is 10100110. The dashed line 23 indicates the boundary of the indicia field. If each indicia element is 1/16 inch wide, the indicia field is $\frac{1}{2}$ inch wide. The sensor 19 preferably has a field of $1\frac{1}{2}$ inches.

In the sensor 19 a row 24 of photodiodes 25 responds to light reflected from the indicia elements displayed on the signature 22. Preferably three photodiodes 25a, 25b, 25c, sometimes referred to as a "triad," respond to the stimulus from each bit of the indicia. As will appear, only the signal from the center diode of the triad responding to one indicia element is used. This minimizes erroneous signals from fringe effects between adjacent indicia elements. With an 8 bit code and a sensor field three times the indicia field, 64 photodiodes are used.

Figure 6:
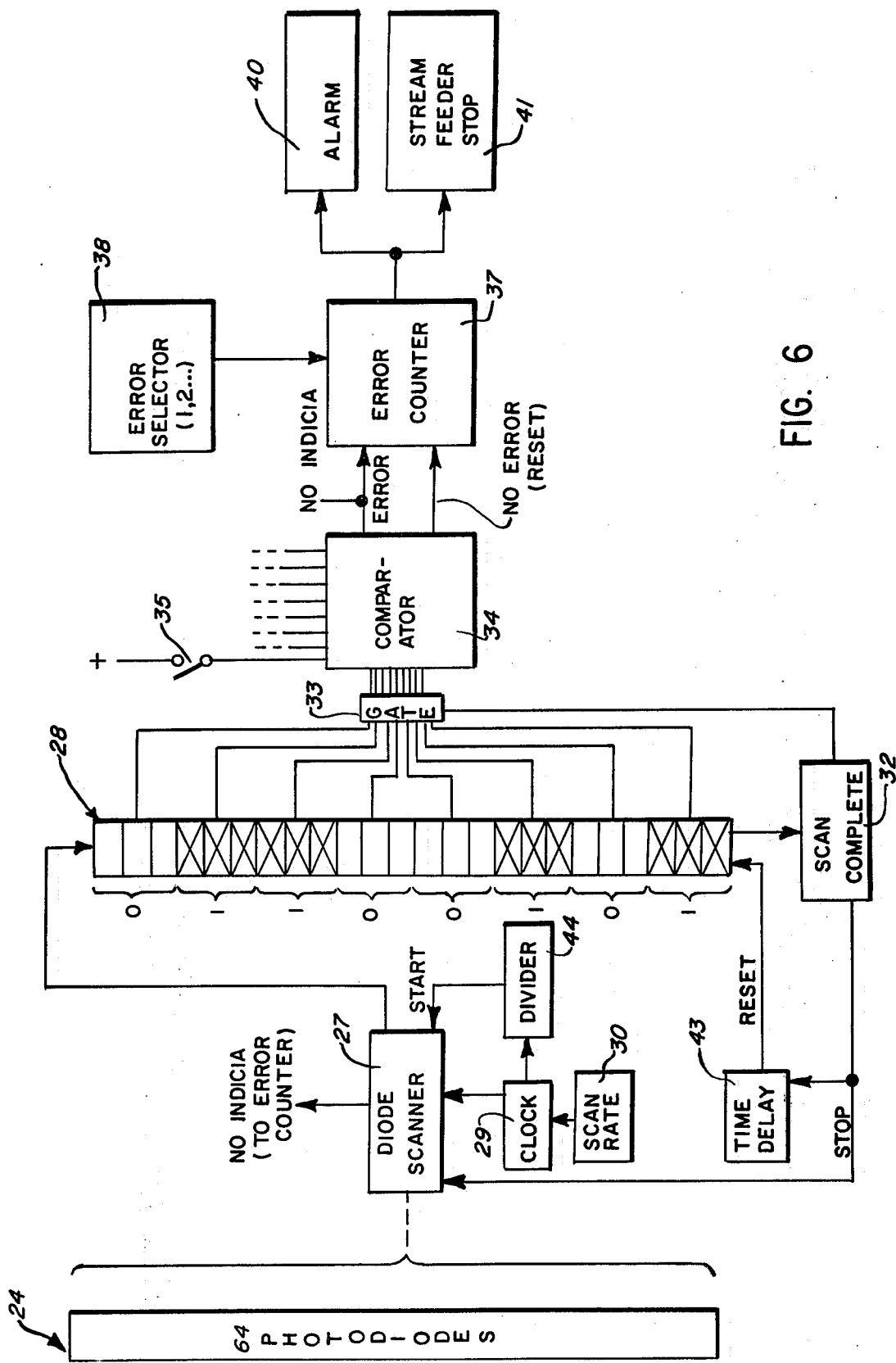
FIG. 6 is a block diagram of the signature verification system.

The circuit of the signature verifier is illustrated in FIG. 6. Photodiodes 24 simultaneously sense the signature indicia. The outputs of each of the photodiodes is selected sequentially by diode scanner 27 and connected with a shift register 28. The shift register has 24 stages for an 8 bit code with three photodiodes per bit.

The diode scanner is controlled by a clock 29 having a scan rate control 30. A scanning sequence is initiated with the stages of shift register 28 empty. As the photodiodes 24 are scanned, signals from them representing 1 bits of the indicia are coupled to and advanced through the shift register. The signal representing the START bit of the indicia is the first 1 bit signal scanned and connected with the shift register. When the START bit signal reaches the last stage of the shift register, SCAN COMPLETE detector 32 recognizes its presence and provides an output which stops diode scanner 27. Another output from SCAN COMPLETE detector 32 actuates a gate circuit 33 coupling simultaneously to comparator 34 signals representing the sensed signature indicia. The signals are taken from shift register stages corresponding with the center one of each triad of photodiodes for each indicia element or code bit. The X's in the boxes of shift register 28 indicate the presence of signals which correspond with the dark indicia elements. The indicia represented in the shift register is 10100110, the same as that illustrated in FIG. 4.

Comparator 34 is provided with indicia input switches 35 (only one being illustrated) for each bit of the code being used. These switches are adjusted prior to operation for the coded indicia on the signatures. If the signals from shift register 28 agree with the preset indicia coding of comparator 34, a NO ERROR output is derived from the comparator. If, however, the signals do not agree, there is an ERROR output which is connected with error counter 37. The error counter is set by error selector 38 for the number of errors which may be tolerated. If there are successive errors to equal the selected number, the error counter provides a warning signal to an alarm 40 and to a STREAM FEEDER STOP control 41. The occurrence of a NO ERROR signal from comparator 34 resets error counter 37.

Following the completion of each scan of the photodiodes, a signal from SCAN COMPLETE detector 32 through time delay 43 resets shift register 28. The diode scanner 27 is restarted in accordance with the selected scan rate by a signal from clock 29 through divider 44.

If diode scanner 27 scans all the photodiodes without encountering an indicia signal, a NO INDICIA signal is generated which is coupled to the error input of error counter 37.

The sensitivity of the system is a function of the scan rate as set by selector 30 and the error count selector 38, together with the speed at which the signatures move past the inspection point. For example, if the signature speed and scan rate are such that each signature is scanned five times and the counter is set for a count of 5, the presence of one bad signature will cause a warning. If, however, each signature is scanned only once, five bad signatures are required to establish the warning.

A modified signature verifier which may be used to check a plurality of signatures 50 to be bound in a volume 51 is illustrated in FIG. 7. Each of the signatures has coded indicia on the backbone thereof. A bank 52 of sensors has a row 53 corresponding with each of the signatures 50, there being six illustrated in the drawing. A row scanner 55 is provided with suitable START and STOP signals and connects the diode sensor signals from each row to the input of diode scanner 27. Comparator 34 is provided with a suitable sequencing switch (not shown) to set the comparator for the appropriate signature indicia as each successive row of sensors is scanned.

We claim:

1. A verifier for signatures of a book, each signature having a coded indicia thereon, comprising:
   means for repetitively sensing the indicia on one or more signatures;
   means for comparing the sensed indicia with the coded indicia of a desired signature;
   a counter responsive to said comparing means for totaling the sensed indicia errors; and
   means responsive to repeated errors in the sensed indicia totaled by said counter to generate a warning signal.

2. The signature verifier of claim 1 including means responsive to sensing of a correct indicia to reset said counter.

3. The signature verifier of claim 1 including means for selecting the number of error counts required to establish said warning signal.

4. A verifier for a signature stream feeder in which signatures successively pass an inspection point, the signatures each having indicia thereon, comprising:
   means for sensing the indicia on each signature as the signatures pass said inspection point;
   means for comparing the sensed indicia with the desired signature indicia; and
   means responsive to the sensing of an erroneous indicia for stopping said stream feeder.

5. A verifier for a signature stream feeder in a gathering machine, said stream feeder having means receiving a vertical stack of signatures, each signature having binary indicia in contrasting colors along the backbone thereof, the signatures being stacked with the backbones of each facing in the same direction, said verifier comprising:
   a plurality of photosensors in a row adjacent said signature stack receiving means and extending generally parallel with the signature backbone to sense the binary indicia of each signature as signatures are withdrawn from the bottom of the stack by the stream feeder and each signature successively passes the photosensors, the sensing area of the photosensors being greater than the extent of the identification code in the direction along the signature backbone and less than the extent of the identification code in the direction of stack movement;
   a photosensor scanner for sequentially scanning the outputs of each photosensor;
   a shift register for receiving the sequential outputs of the photosensors;
   means for detecting the completion of the scanning of the photosensors responding to a binary signature indicia;
   an indicia comparator;
   means responsive to said detecting means for simultaneously transferring the photosensor signal from the shift register to the comparator; and
   means responsive to detection of an indicia error by said comparator for generating a warning signal.

6. The signature verifier of claim 5 including means responsive to said warning signal for stopping said stream feeder.

7. The signature verifier of claim 5 including means for setting said indicia comparator for the indicia of the desired signature.

8. The signature verifier of claim 5 for signatures having an indicia with a start element, in which the means for detecting the completion of the scanning of the photosensors includes means responsive to receipt of the signal representing the start element of the indicia in the last stage of said shift register.

9. The signature verifier of claim 5 in which the rate of scanning the photosensors is adjustable.

10. The signature verifier of claim 5 including a counter responsive to the detection of errors by said comparator for generating a warning signal.

11. The signature verifier of claim 10 including means for adjusting the number of errors to which said counter responds.

12. The signature verifier of claim 11 including means responsive to an output of said comparator indicating no error to reset said counter.

13. The signature verifier of claim 10 including means for detecting a signature with no indicia and for actuating said counter in accordance therewith.

14. An indicia translator for a coded indicia of binary elements with a start element which contrasts with its background, comprising:
 a plurality of sensors to sense said coded indicia elements simultaneously, there being more sensors than elements of the indicia;
 means for scanning said sensors sequentially, generating sequential signals representing said indicia elements;
 a shift register connected with said scanning means to receive said sequential signals; and
 means responsive to reception of the signal representing said indicia start element at the last stage of said shift register to indicate that the sensors responding to the indicia have all been scanned.

15. The indicia translator of claim 14 including means responsive to receipt of the signal representing said indicia start element at the last stage of said shift register to transfer the signals stored in the shift register simultaneously from the shift register to a coded indicia element signal utilization circuit.

16. An indicia verifier in which the coded indicia element signal utilization circuit of the indicia translator of claim 15 is a signal comparator for comparing said signals with the desired coded indicia.

17. The indicia verifier of claim 16 in which said comparator has means for selecting the desired coded indicia.

18. The indicia translator of claim 14 for indicia elements with a linear dimension, the translator having at least three aligned sensors spanning the linear dimensions of an indicia element, and in which the signal from the center one of each set of three sensors is utilized from said shift register.

19. A verifier for a plurality of assembled signatures to be bound in a volume, each of the signatures having a coded indicia on the backbone thereof, comprising:
 a bank of sensors with a row of sensors for each of said signatures, for simultaneously sensing said indicia on the backbone of each of said signatures;
 means for sequentially scanning each of the sensors, row by row, generating sequential signals representing the indicia of each signature;
 means for comparing the indicia representing signals with the desired signature indicia; and
 means responsive to the occurrence of an erroneous indicia signal for generating a warning signal.

* * * * *